(12) United States Patent
Tokizawa et al.

(10) Patent No.: US 6,698,083 B2
(45) Date of Patent: *Mar. 2, 2004

(54) METHOD FOR MANUFACTURING ROTARY ELECTRIC MACHINE

(75) Inventors: Takashi Tokizawa, Nisshin (JP); Mitsuru Kato, Anjo (JP); Mitsuaki Taira, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/263,695

(22) Filed: Oct. 4, 2002

(65) Prior Publication Data

US 2003/0024101 A1 Feb. 6, 2003

Related U.S. Application Data

(63) Continuation of application No. 09/538,983, filed on Mar. 30, 2000, now Pat. No. 6,490,779.

(30) Foreign Application Priority Data

Mar. 30, 1999 (JP) .............................. 11-89790
Dec. 24, 1999 (JP) ........................... 11-366258

(51) Int. Cl.⁷ .............................. H02K 15/16
(52) U.S. Cl. .............................. 29/596; 29/606; 29/605
(58) Field of Search .................... 29/596, 598, 605, 29/606; 242/432; 310/133, 179, 42, 178

(56) References Cited

U.S. PATENT DOCUMENTS

| 1,258,735 | A | | 3/1918 | Apple |
|---|---|---|---|---|
| 1,348,198 | A | | 8/1920 | Apple |
| 3,815,207 | A | | 6/1974 | Habegger |
| 4,225,770 | A | | 9/1980 | Moore et al. |
| 4,436,982 | A | | 3/1984 | Kokura et al. |
| 4,437,230 | A | | 3/1984 | Greutmann |
| 4,951,379 | A | * | 8/1990 | Clemenz ...................... 29/597 |
| 5,745,977 | A | | 5/1998 | Ichikawa et al. |
| 6,141,864 | A | | 11/2000 | Bugosh |
| 6,403,921 | B1 | | 6/2002 | Maeda et al. |

FOREIGN PATENT DOCUMENTS

| DE | 40 31 276 | 4/1992 |
|---|---|---|
| WO | 92/06527 | 4/1992 |
| WO | 98/54823 | 12/1998 |

OTHER PUBLICATIONS

U.S. patent application 09/482,959, Method And Apparatus For Welding A Plurality Of Windings Of Rotary Electric Machine, Maeda et al., Jan. 14, 2000, issued as U.S. Patent No. 6,403,921.

* cited by examiner

Primary Examiner—Peter Vo
Assistant Examiner—Stephen Kenny
(74) Attorney, Agent, or Firm—Oliff & Berridge, PLC

(57) ABSTRACT

A winding on a stator of a rotary electric machine is constructed by welding end portions of a plurality of segments. A plurality of pairs arranged on an end of the stator are welded by a welder. In a welding stage, the pairs are held by a plurality of insertion rods of a circumferential side holding tool. The insertion rods are radially disposed. The insertion rods are movable in a radial direction. The insertion rods are moved back toward a radial outside to release a holding of the pairs after ball-shaped welding marks are formed. Holding is released without damage on the welding mark.

10 Claims, 5 Drawing Sheets

METHOD FOR MANUFACTURING ROTARY ELECTRIC MACHINE

This is a Continuation of application Ser. No. 09/538,983 filed Mar. 30, 2000 now U.S. Pat. No. 6,490,779. The entire disclosure of the prior application(s) is hereby incorporated by reference herein in its entirety.

CROSS-REFERENCE TO RELATED APPLICATION

This application is based on Japanese Patent Application No.Hei 11-89790 filed on Mar. 30, 1999 and No.Hei 11-366258 filed on Dec. 24, 1999 the contents of which are incorporated herein by reference.

BACKGROUND OF THE INVENTION

1. Field of the Invention

The present invention relates to a method for manufacturing a rotary electric machine, particularly, to a method for manufacturing a winding thereof. This method is preferable for manufacturing a stator of a vehicular AC generator mounted on a vehicle, a truck or the like.

2. Description of Related Art

Conventionally, in the art of the rotary electric machine, it is known that an entirety of a winding wound and disposed on a core is constructed from a plurality of segments. In such a construction, a plurality of segments are fitted on the core. After that, the winding is manufactured by joining these segments. Soldering, welding, brazing or the like is used as a joining method. In the case of welding, arc welding, laser welding, electron beam welding or the like may be used.

In a case that joining process for a plurality of points are executed in the manufacturing method of the rotary electric machine, it is required to execute a large number of joining at high speed. Additionally, to improve an industrial productivity, it is necessary to execute a large number of joining reliably and speedily. Specifically, it is necessary to fix and hold a plurality of joining points in desired position efficiently, to execute the joining work under a holding condition and to release the holding condition without a damage on the joining portion.

SUMMARY OF THE INVENTION

It is therefore an object of this invention to provide a manufacturing method of a rotary electric machine for joining a plurality of joining points at high speed.

It is a further object of this invention to provide a manufacturing method of a rotary electric machine for joining a plurality of joining points reliably.

It is another object of this invention to provide a manufacturing method for holding a plurality of joining points efficiently, and for releasing a holding condition without a damage on the joining point after joining, even in a case that the joining work is executed on the plurality of joining points.

According to the present invention, a plurality of holding tools are disposed in between pairs of end portions to be joined, and the holding tools are moved back in a direction crossing an extending direction of the end portions to release holding. It is possible to hold the plurality of pairs to be joined efficiently, and to prevent a damage on a joining mark. The moving direction of the holding tool may be at a right angle against the extending direction of the end portion.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF PREFERRED EMBODIMENTS

Figure 1:
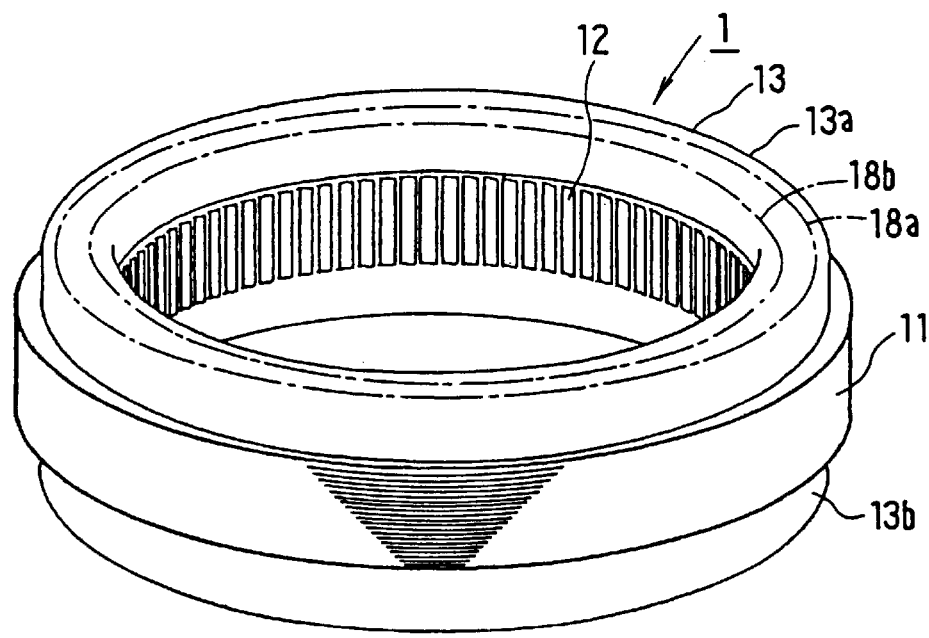
FIG. 1 is a perspective view showing an outside appearance of a stator of a rotary electric machine of a first embodiment of the present invention.

Hereafter, an embodiment will be described based on the drawings. The present invention is applied to a manufacturing method of a stator winding for a vehicular AC generator as a rotary electric machine.

A stator 1 of the vehicular AC generator has a cylindrical stator core 11. The stator core 11 is formed by laminating a plurality of steel sheets. A plurality of slots 12 are formed to extend in the axial direction on the inside surface of the stator core 11. A stator winding 13, which is a winding, is positioned in the slots 12. The stator winding 13 is a three phase winding as a poly-phase winding. The stator winding 13 forms a first coil end group 13a on one axial end of the core 2. The winding 13 forms a second coil end group 13b on the other axial end of the core 2. The winding 13 is constructed a plurality of segments made of copper wire. The segments are disposed in each of the slots 12 as conductors. Further, insulating sheets 14 are disposed in between each of the slots 12 and the electric conductors disposed therein.

Figure 2:
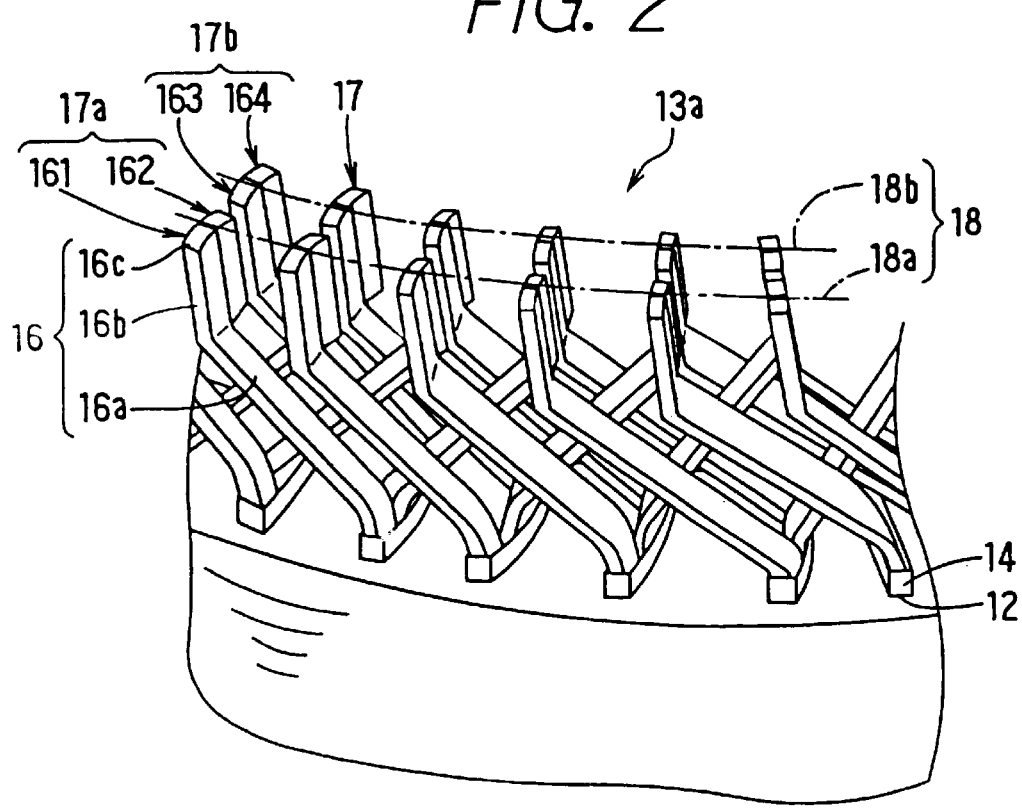
FIG. 2 is an enlarged perspective view of a part of FIG. 1, showing an appearance before welding of the first embodiment.
Figure 3:
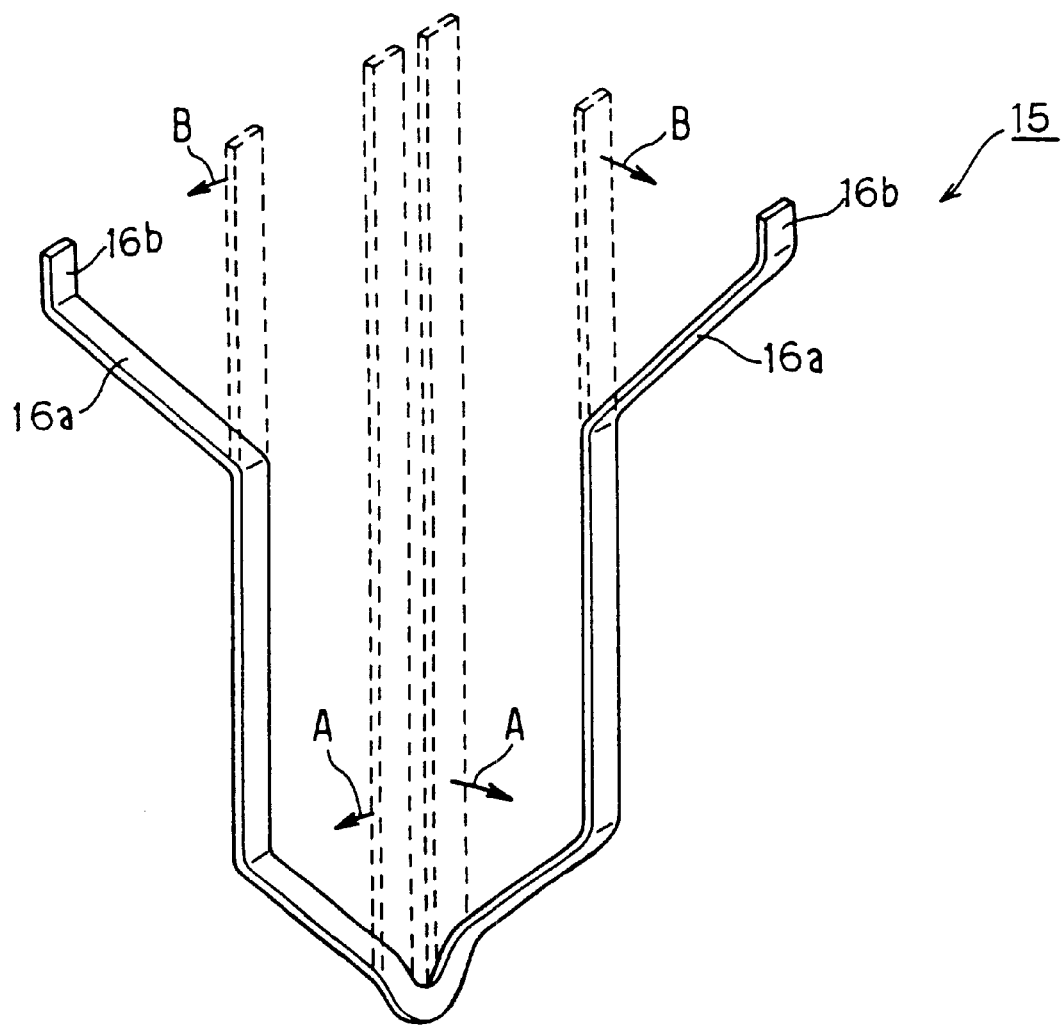
FIG. 3 is a perspective view showing a shape of a segment of the first embodiment.

The winding 13 is formed by joining the segments. In this embodiment, U-shaped segments 15 shown in FIG. 3 are mainly used. I-shaped segments can be used alternatively. The U-shaped segments shown in FIG. 3 are formed by bending a conductor wire having a flat cross-section into a U-shape, and twisting both arm portions at a designated position in a designated direction. In this embodiment, the U-shaped segments including a small and a large types as shown in FIG. 3 are used. The U-shaped segments are twisted as indicated by arrows A and inserted from one axial end of the core 11. After that, end portions 16 extended from the other axial end of core 11 are twisted as indicated by arrows B. Therefore, the U-shaped segments form the coil end group 13a as shown in FIG. 2. The end portions 16 has skew portions 16a extending obliquely, tip portions 16b extending axially, and end surfaces 16c thereon. The tip portions 16b are provided for a joining stage In this embodiment, four segments are disposed in one slot to make four layers in the radial direction. As a result, in the first coil end group 13a, four end portions 161, 162, 163 and 164 are aligned in the radial direction. Two end portions 161 and 162, which are adjacent in the radial direction, form a pair 17 (17a) of the tip to be joined. Two end portions 163 and 164, which are adjacent in the radial direction, also form a pair 17 (17b) of the tip to be joined. In this embodiment, the pairs 17 are arranged on a line to make a ring 18. Additionally, the pairs 17 form multiple coaxial rings of different diameters. The pairs 17 are arranged on two parallel ring lines which are a plurality of parallel lines. The plurality of outer pairs 17a make an outer ring 18a. The plurality of inner pairs 17b make an inner ring 18b.

A continuous winding disposed around the stator core 11 is formed by joining the pairs 17 disposed as shown in FIG. 2.

Next, manufacturing process of the stator will be described. At first, the stator core 11 is manufactured. Secondly, the process proceeds to a stage for inserting the plurality of segments 15 on the core 11 and a stage for arranging the plurality of pairs. In this stage, the segments 15 are inserted into the slots 12 from one of the axial end of the stator core 11. The plurality of end portions 16 extended from the other end of the core 11 are twisted as shown in FIG. 2. The end portions 16 are arranged as shown in FIG. 2 by the twisting process. Two tips are arranged in the radial direction as the pair 17. Next, a holding stage and a welding stage are carried out. Two end portions 16 are electrically joined by welding the pairs 17. As a result, the winding is formed by connecting the plurality of segments 15 in series.

Next, the holding stage and the welding stage are described in detail. In the holding stage, at first, the stator assembly processed into the shape shown in FIG. 2 is held and fixed. The stator core 11 is fixed on a core fixing device 21. Next, the pairs 17 are held and fixed in the designated shape and position shown in FIG. 2 by a plurality of holding tools 22. The holding tools 22 have an inside holding tool 23, an outside holding tool 24 and a circumferential side holding tool 25. These holding tools 22 also act as an electrodes to supply electric current for welding.

The inside holding tool 23 is constructed in a disk shape. The inside holding tool 23 is an assembly of a plurality of fan-shaped portions. The fan-shaped portions are movable toward inside and outside in the radial direction by a driving device 23a. The inside holding tool has an upper portion 23b and a lower portion 23c, and has a plurality of holes 23d therebetween. The holes 23d are disposed as a plurality of coupling portions radiating in all directions. The holes 23d open toward a radial outside. The inside holding tool 23 defines a radial inside position of the plurality of pairs 17 arranged on the radial direction. The inside holding tool 23 contacts a radial inside surface of the end portion 164 positioned on the most inside.

The outside holding tool 24 is constructed in a ring shape. the outside holding tool 24 is an assembly of a plurality of fan-shaped portions. The fan-shaped portions are movable toward inside and outside in the radial direction by a driving device 24a. The outside holding tool has a movable portion 24b. The outside holding tool 24 defines a radial outside position of the plurality of pairs 17 arranged on the radial direction. The outside holding tool 24 contacts a radial outside surface of the end portion 161 positioned on the most outside.

The circumferential side holding tool 25 is constructed by a plurality of insertion rods disposed radially. Each of the insertion rod is movable toward inside and outside in the radial direction by a driving device 25a. The circumferential side holding tool 25 has a plurality of insertion rods 25b disposed to extend in all directions. In this embodiment, the plurality of insertion rods move in the radial direction all together by the driving device 25a. The moving direction of the insertion rods 25b crosses the direction of extension of the pairs 17. The crossing angle is at right. The driving device can be so constructed that the plurality of insertion rods 25b are moved in sequence. The driving device can be also constructed to provide the following movements: the plurality of insertion rods are moved in the axial direction to insert it into recesses between the plurality of pairs 17 when the plurality of insertion rods 25b are installed; and the plurality of insertion rods are moved in the radial direction toward the outside to pull it out when the plurality of insertion rods 25b are uninstalled.

Each of the insertion rods 25b has a first portion 25c tapered off to the tip and a wider second portion 25d positioned on radial outside. The first portion 25c has a width corresponding to a distance between the tip portions 16b of two pairs 17 which are adjacent in the circumferential direction. The first portion 25c is disposed between two pairs 17 which are adjacent in the circumferential direction. The second portion 25d is protruded in one side of the circumferential direction to form a step portion from the first portion 25c. A surface 25e provided by the step portion defines the radial outside position of the plurality of pairs 17 arranged in the radial direction. The surface 25e contacts the radial outer surface of the end portion 161 positioned in the most outside. The tip of the insertion rod 25b can be inserted into and coupled with the hole 23d of the inside holding tool 23. The plurality of insertion rods 25b are radially positioned and fixed in its designated position by inserting the tip of the insertion rod 25b into the hole 23d. The tip is coupled tightly in both the circumferential and axial directions. The coupling on the circumferential direction is more important than the axial direction for an accurate positioning. The plurality of insertion rods, forming the circumferential side holding tool 25, can be constructed integrally with the outside holding tool 24.

Figure 4:
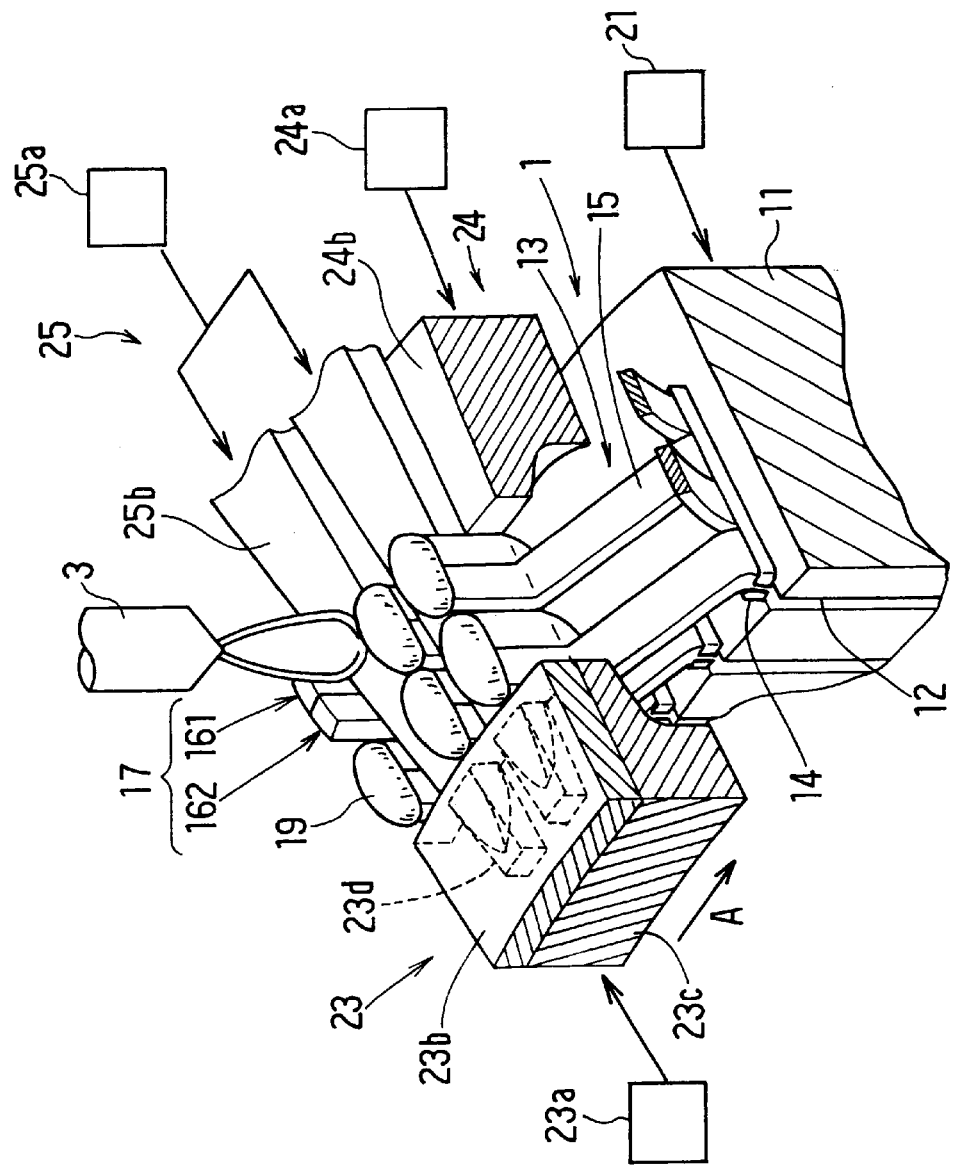
FIG. 4 is a perspective view showing a welding stage of the first embodiment.
Figure 5:
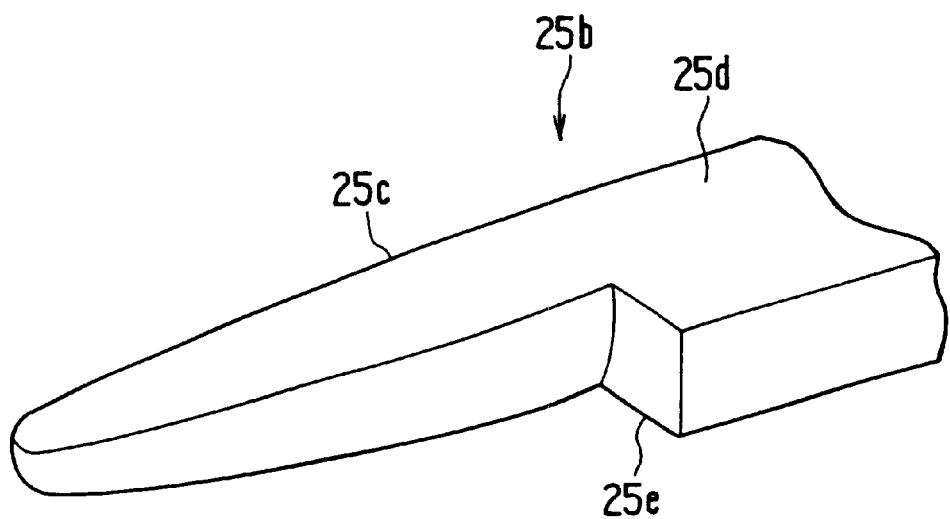
FIG. 5 is a perspective view showing an insertion rod of a circumferential side holding tool of the first embodiment.
Figure 6:
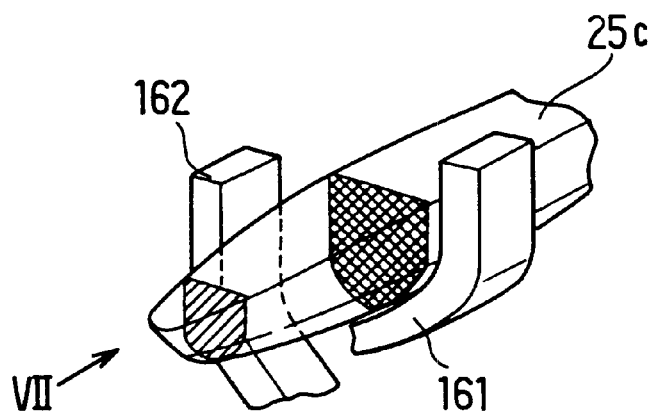
FIG. 6 is a perspective view showing an inserting stage of the insertion rod of the first embodiment.
Figure 7:
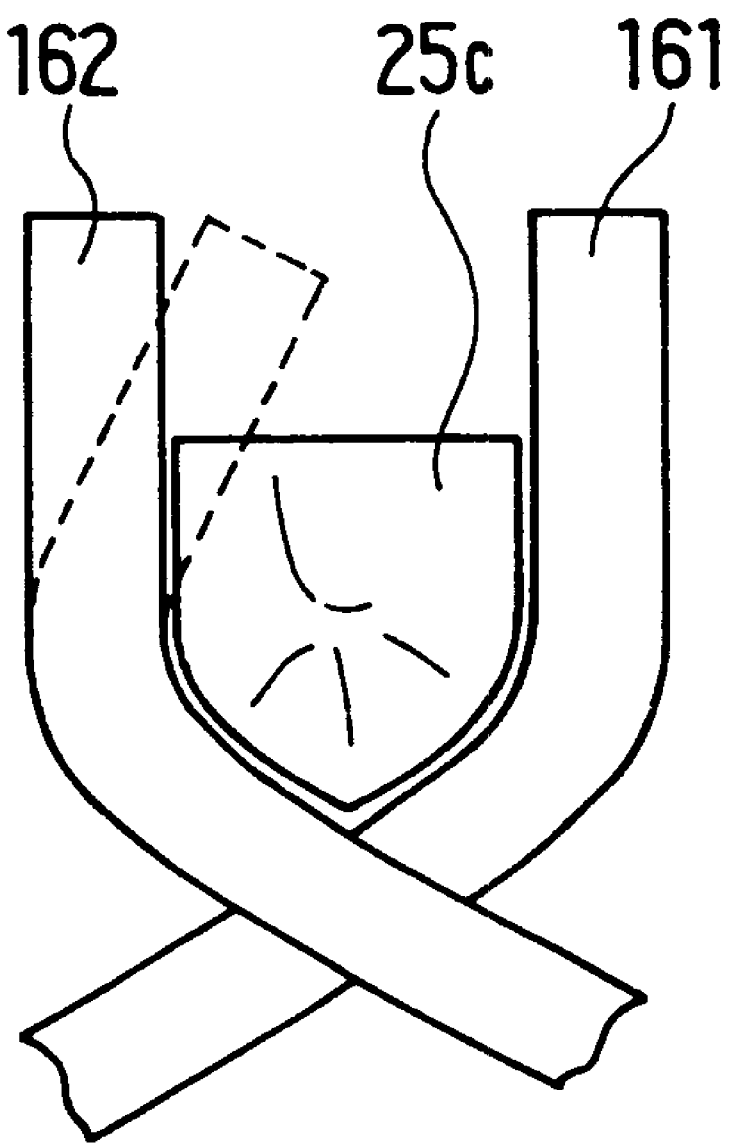
FIG. 7 is a plan view showing the insertion rod from an arrow direction VII in FIG. 6.

In this embodiment, the insertion rods 25b are installed between adjacent pairs 17 to make an appearance shown in FIG. 4 by moving it to insert from the radial outside. As shown in FIG. 6, the first portion 25c of the pairs 25b has a cross sectional shape corresponding to a shape of gutters on an inserting path. The gutters are formed by the plurality of end portions 161, 162, 163 and 164. As shown in FIG. 7, the first portion 25c of the insertion rod 25b appears like a bottom of ship in the view from the tip. The first portion 25c has a cross section shaped as the home base corresponding to a shape of the skew portion 16a and the tip portion 16b. The first portion 25c is made of a smooth surface not to damage the end portions. The shape of the end portions are modified into the designated proper shape by inserting such the insertion rods 25b.

A function of this embodiment will be described referring to, for instance, the case that the end portion 162 is bent more than the designated proper shape shown by the broken line in FIG. 7. With the insertion of the first portion 25c, the end portion 162 is modified by bending along the cross section of the first portion 25c. As a result, the end portion 162 is modified into the designated proper position shown by the solid line. Therefore, the pairs 17 are held and fixed in the designated proper positions by the holding tools. The insertion rod 25b is contacted both of the pairs 17a and 17b belonging to the outer ring 18a and the inner ring 18b. After that, the plurality of pairs 17 are welded respectively.

In the welding stage, at first, a TIG welder head 3 is positioned to direct toward a top end of the pair 17. Next, the welding current is supplied between the head 3 and the holding tools 23, 24 and 25 to generate an arc. The top end of the pair 17 is melted into a fusion by the arc. The pair 17 was just arranged before it melts. The head 3 is moved to the next pair after it melts a predetermined amount. In this embodiment, the relative movement between the head 3 and the plurality of pairs 17 is provided by holding the head 3 and rotating the stator 1 with the holding tools in a direction indicated by the arrow in FIG. 4. This direction may be reversed. On the top of the pair 17, a welding mark 19 is formed as a joining mark by solidifying the melted copper again. Therefore, the pair of the end portions constituting the pair 17 are electrically connected. The welder is continuously activated during the head 3 moves around the plurality of pairs 17 while being directed thereon. As a result, the arc passes over around the plurality of pairs aligned on the line, and weld them around. In this embodiment, the plurality of pairs 17 forming the outer ring 18a are continuously welded after the plurality of pairs 17 forming the inner ring 18b are continuously welded. FIG. 4 shows the welding stage of the outer ring 18a. As the welding stage, plasma welding, gas welding, laser welding, electric resistance welding or the like may be used except for arc welding.

After completion of the welding stage, on the top of the pair 17, the welding mark 19 having larger diameter than the pair 17 is formed. The welding mark 19 is substantially a ball shape due to the surface tension before it solidifies. The welding mark 19 projects in the circumferential and radial directions relative to the end portion 17 which is not welded. A melting range is preferably limited to prevent an enlargement of the welding mark 19. However, there is a limit to make the melting range small, because of a strength and an electric resistance on the welding mark 19. Then, the welding mark 19 will be the above-mentioned shape.

After completion of the welding stage, the holding tools 23, 24 and 25 are moved back to release the holding of the pairs 17. After that, the welded stator 1 is taken out. The process proceeds to a next coating stage for the welding mark 19. Then, the stator 1 is assembled into the vehicular AC generator as the rotating electric machine.

In this embodiment, the insertion rods 25b are inserted with rubbing on the side surface of the end portions 16 when the insertion rods 25b are installed. Therefore, it is easy to provide electric conduction between the insertion rods 25b and each end portion 16. Further, in the stage for releasing the holding of the plurality of end portions 17, the insertion rods 25b, which is a circumferential side holding tool, are moved radially outside. Therefore, it is prevented to make an interference such as the collision between the welding mark 19 and the circumferential side holding tool 25. As a result, a damage on the welding mark 19 is prevented. It is also prevented to deform the welded end portion 16. Further, a damage on an insulating film covering the copper wire forming the segment 15 is prevented.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A method of manufacturing a rotary electric machine comprising a core and a plurality of conductors on the core, the method comprising the steps of:

placing end portions of the conductors to be joined between holding tools that hold the end portions in a predetermined shape;

joining the end portions by forming a joining mark thereon while holding the end portions by the holding tools; and removing both of the holding tools by moving both of the holding tools in a manner that the holding tools are prevented from contact with the joining mark.

2. The method of manufacturing a rotary electric machine according to claim 1, wherein the step of removing is performed by moving both of the holding tools in a manner that the holding tools slide on surfaces of the conductors except for the joining mark.

3. The method of manufacturing a rotary electric machine according to claim 2, wherein the step of placing is performed by placing the end portions between the holding tools that is movable between an engaged position in which the end portions are held in a predetermined shape and a disengaged position in which the end portions are free from the holding tools.

4. The method of manufacturing a rotary electric machine according to claim 3, wherein the step of placing comprises the steps of:

arranging the end portions in an manner that the end portions are adjacent each other; and moving the holding tools from the disengaged position to the engaged position so that the end portions arranged in the step of arranging are held between the holding tools.

5. The method of manufacturing a rotary electric machine according to claim 4, wherein the step of removing is performed by moving both of the holding tools simultaneously.

6. A method of manufacturing a rotary electric machine comprising a core and a plurality of conductors on the core, the method comprising the steps of:

placing end portions of the conductors to be joined among holding tools;

joining the end portions while holding the end portions by the holding tools; and removing the holding tools, wherein the step of placing comprises:

placing the end portions between first pair of the holding tools that hold the end portions with respect to a first direction; and placing the end portions between second pair of holding tools that holds the end portions with respect to a second direction perpendicular to the first direction.

7. The method of manufacturing a rotary electric machine according to claim 6, wherein the end portions are located on an axial end of the core, the first pair of the holding tools hold the end portions with respect to a radial direction of the core, and the second pair of the holding tools hold the end portions with respect to a circumferential direction of the core.

8. The method of manufacturing a rotary electric machine according to claim 6, wherein both of the first pair of holding tools and the second pair of holding tools are movable in the same direction.

9. The method of manufacturing a rotary electric machine according to claim 8, wherein the holding tools are movable in the radial direction.

10. A method of manufacturing a rotary electric machine comprising a core and a plurality of conductors on the core, the method comprising the steps of:

placing end portions of the conductors to be joined among holding tools;

joining the end portions while holding the end portions by the holding tools; and removing the holding tools, wherein the step of placing comprises:

placing the end portions between first pair of the holding tools that hold the end portions with respect to a first direction; and placing the end portions between second pair of holding tools that holds the end portions with respect to a second direction perpendicular to the first direction;

wherein the step of placing the end portions between the first pair of the holding tools is performed before the step of placing the end portions between the second pair of holding tools, and the step of placing the end portions between the second pair of holding tools is performed by moving the second pair of holding tools relative to the end portions held by the first pair of holding tools.

* * * * *